United States Patent
Wada et al.

[11] Patent Number: 5,341,891
[45] Date of Patent: Aug. 30, 1994

[54] MOTOR-DRIVEN POWER STEERING APPARATUS AND METHOD

[75] Inventors: Shunichi Wada; Tadayuki Hara; Yasuo Naito; Shinichi Kohge; Kazuhisa Nishino, all of Himeji, Japan

[73] Assignee: Mitsubishi Denki Kabushiki Kaisha, Tokyo, Japan

[21] Appl. No.: 946,598

[22] Filed: Sep. 18, 1992

[30] Foreign Application Priority Data

Sep. 26, 1991 [JP] Japan .................. 3-247914

[51] Int. Cl.$^5$ .............................. B62D 5/00
[52] U.S. Cl. ........................... 180/79.1; 180/143; 318/434; 388/831; 364/424.05
[58] Field of Search .............. 180/79.1, 142, 143; 318/434; 388/831; 364/424.05

[56] References Cited

U.S. PATENT DOCUMENTS

| | | | |
|---|---|---|---|
| 4,573,545 | 3/1986 | Kalns | 180/79.1 |
| 4,849,889 | 7/1989 | Morishita et al. | 364/424.05 |

FOREIGN PATENT DOCUMENTS

| | | | |
|---|---|---|---|
| 20267 | 1/1988 | Japan | 180/79.1 |
| 180568 | 7/1988 | Japan | 180/79.1 |

*Primary Examiner*—Mitchell J. Hill
*Attorney, Agent, or Firm*—Sughrue, Mion, Zinn, Macpeak & Seas

[57] ABSTRACT

A motor-driven power steering apparatus and method for a vehicle are able to avoid frequent on-off operations of an electromagnetic clutch 14 as much as possible, which connects or disconnects a motor 13 with or from a steering system, thus improving the durability of the clutch 14 and suppressing the generation of undesirable noise and shocks upon connection and disconnection of the clutch 14. A clutch controller 191 controls a clutch current Ic supplied to the clutch 14 based on the vehicle speed V in such a manner that it sets the clutch current Ic to a first predetermined clutch current level I(V) so as to place the clutch into a substantially engaged state when the vehicle speed V is less than a first predetermined vehicle speed Vo, and to a second predetermined clutch current level Icr which is less than the first predetermined clutch current level I(V) so as to place the clutch into a partially engaged state when the vehicle speed V is equal to or greater than the first predetermined vehicle speed Vo. Preferably, the clutch current Ic is set to a third predetermined clutch current level Ico which is less than the second predetermined clutch current level Icr so as to substantially disengage said electromagnetic clutch when a steering torque T is equal to or greater than a predetermined value To when the vehicle speed is equal to or greater than the first predetermined value Vo.

10 Claims, 5 Drawing Sheets

MOTOR-DRIVEN POWER STEERING APPARATUS AND METHOD

BACKGROUND OF THE INVENTION

This invention relates to a motor-driven steering apparatus and method for a vehicle in which a motor is operatively connected with steerable road wheels of the vehicle through a clutch for assisting the steering operation of the driver. More particularly, it relates to such an apparatus and a method as described in which the clutch is turned on to connect the motor with the steerable road wheels even during high speed travel of the vehicle except for the time when an abnormality in the power steering operation is detected.

FIG. 5 a schematic representation of a conventional motor-driven power steering apparatus as described in Japanese Patent Laid-Open No. 62-255273 or Japanese Patent Laid-Open No. 63-215461.

Referring to the figure, designated at reference numeral 1 is a steering wheel which is turned by the driver of a vehicle for steering operation. A steering shaft or column, generally designated at 2, serves to transmit torque imparted by the driver to the steering wheel 1 toward steerable road wheels (not shown) through a pinion and rack mechanism. The steering shaft 2 includes a first shaft section 2a which is connected at its upper end with the steering wheel 1, and a second shaft section 2b which is connected at its upper end via a universal joint 4a with the first shaft section 2a. A steering torque sensor 3 is mounted on the steering shaft 2 for sensing the steering torque T of the steering wheel 1. The pinion and rack mechanism includes a first pinion shaft 5 which is connected via a universal joint 4b with a lower end of the second shaft section 2b of the steering shaft 2, and a rack rod 6 which is connected at its opposite ends with the unillustrated steerable road wheels and which has a first threaded portion 6a engaged with the first pinion shaft 5, and a second threaded portion 6b. The elements 1 through 6 together constitute a steering system.

A vehicle speed sensor 10 senses the speed V of the vehicle at which the vehicle is travelling, and generates a corresponding output signal to a control unit 9. The control unit 9 includes a microcomputer for controlling a motor 13 in the form of a DC motor and a clutch 14 in the form of an electromagnetic clutch based on the steering torque T and the vehicle speed V as sensed by the steering torque sensor 3 and the vehicle speed sensor 10 so as to properly perform power assist for steering. A battery 11 mounted in the vehicle is directly connected to the control unit 9 for supplying power thereto, and it is also connected through a key switch 12 and the control unit 9 to the motor 13 and a clutch 14 to be described later for energizing them, the key switch 12 being connected between the battery 11 and the control unit 9. The motor 13 has an unillustrated rotating shaft which is connected via the clutch 14 with a worm shaft 15 which is in meshing engagement with a worm wheel 16. The worm wheel 16 is connected with a second pinion shaft 18 which is engaged with the second threaded portion 6b of the rack rod 6. The worm shaft 15 and the worm wheel 16 together constitute a speed reduction mechanism for transmitting the output torque of the motor 13 to the rack rod 6 at a reduced speed for power assist.

FIG. 6 is a block diagram showing the detailed construction of the control unit 9 of the conventional power steering apparatus of FIG. 5. The control unit 9 includes a motor control means 91 for calculating a motor current Io to be supplied to the motor 13 based on the steering torque T and the vehicle speed V and for driving the motor 13, and a clutch control means 92 for supplying a clutch control signal or current C to the electromagnetic clutch 14 to control it such that the clutch 14 is switched off into a disconnected state when the vehicle speed V is equal to and above a predetermined speed Vo (for instance 50 km/hr.), and switched on into a connected state when the vehicle speed V is below the predetermined speed Vo, and a motor current sensing means 93 in the form of a grounded resistor for sensing an actual motor current I flowing through the motor 13 and feeding data thereof back to the motor control means 91.

The motor control means 91, while being fed back with the motor current I sensed by the current sensing resistor 93, applies a voltage to the motor 13 such that a current corresponding to the calculated motor current Io is supplied from the battery 11 to the motor 13 via the control unit 9. When the clutch control means 92 determines a failure or abnormality in the power steering apparatus on the basis of signals output from the various sensors when the vehicle is travelling at low speeds less than the predetermined speed Vo, the clutch control signal or current C is made to a low level to turn off the clutch.

FIG. 7 is a graph showing the clutch control signal C and the calculated motor current Io. As shown at (a) in FIG. 7, the clutch control signal C is "on" or at a high level (e.g., indicative of a clutch current of about 1 ampere) when the vehicle speed V is lower than the predetermined vehicle speed Vo and it is "off" or at a low level (e.g., indicative of a clutch current of 0 ampere) when the vehicle speed V is the predetermined vehicle speed Vo or above.

As shown at (b) in FIG. 7, the calculated motor current level Io increases with the decreasing vehicle speed V and also with the increasing steering torque T when the vehicle speed V is lower than the predetermined vehicle speed Vo, and it is equal to zero when the vehicle speed V is the predetermined vehicle speed Vo or above. Usually, the steering wheel 1 is heavy to turn (i.e., a greater steering torque is required to turn the steering wheel 1) during low speed travel, whereas it is light (i.e., a smaller steering torque is required) during high speed travel irrespective of the road and other conditions. Accordingly, the auxiliary torque or power assist by the motor 13 should be increased with a decrease in the vehicle speed V.

The operation of the conventional motor-driven power steering apparatus shown in FIGS. 5 and 6 will now be described with reference to FIG. 7.

When the vehicle speed V is lower than the predetermined vehicle speed Vo during low speed travel, the clutch control means 92 in the control unit 9 makes the clutch control signal C to a high level to turn the electromagnetic clutch 14 on into a connected state. The motor control means 91 generates a motor current signal Io based on the vehicle speed V from the vehicle speed sensor 10 and the steering torque T from the torque sensor 3 to thereby cause the motor 13 to generate a necessary torque for power steering.

More specifically, with a reduction in the vehicle speed V, the required steering torque T increases, so the motor current 5 level Io corresponding to the output torque of the motor 13 is thus set to an increased level in accordance with the decreasing vehicle speed. When the required steering torque increases due to some cause such as a change in the road condition or the like, the motor current level Io is set to a value corresponding to the increased level of the steering torque T.

Thus, the amount of steering torque or force required of the driver can be held substantially constant irrespective of the driving condition or the like.

When a system failure or abnormality is detected during low speed travel, the clutch control means 92 makes the clutch control signal C to a low level to turn the electromagnetic clutch 14 off, so that the motor is disconnected from the worm shaft 15 to ensure safety in steering. For example, a system failure or abnormality is determined in such a case as when the motor current level Io as calculated by the motor control means 91 or the motor current I as sensed through the current sensing resistor 93 is of an abnormally high value, or when the output of the torque sensor 3 shows that the steering wheel 1 has not been operated by the driver for an unusually long period of time.

During high speed travel in which the vehicle speed V is greater than the predetermined vehicle speed Vo, the clutch control means 92 makes the clutch control signal C to a low level to turn the electromagnetic clutch 14 off, thereby disconnecting the motor 13 from the worm shaft 15. At the same time, the motor control means 91 operates to stop or interrupt the power supply from the battery 11 to the motor 13 via the key switch 12, and hence the motor 13 is stopped. In this situation, even if a system failure such as an abnormality or malfunction in the motor 13, the sensors 10 or the like takes place during high speed travel in which the electromagnetic clutch 14 is turned off to disconnect the motor 13 from the rack rod 6, there will be no trouble or problem in the manual steering operation of the driver.

Subsequently, when the vehicle speed V decreases below the predetermined value Vo, the clutch control signal C from the clutch control means 92 becomes high again to turn the electromagnetic clutch 14, and the motor control means 91 controls the motor current I on the basis of the vehicle speed V and the steering torque T as noted above.

Generally, in the event of failure of the control unit 9, an improper motor current level Io can be supplied to the motor 13, thus causing undesirable forced rotation of the steering wheel 1 without regard to the driver's steering effort. In addition, in the event of a mechanical failure of the motor 13 with the clutch 14 held in a connected state, it becomes difficult for the driver to turn the steering wheel 1, that is, the state of incapability of steering results. Although the driver can deal with these failures by turning the clutch off during low speed travel, it is extremely difficult to well cope with them during high speed travel, thus spoiling safety in driving as is well known in the art.

Accordingly, to avoid the above-described situations, when the vehicle speed V exceeds the predetermined vehicle speed Vo, the clutch control signal C is made to a low level to provide for fail-safe operation and hence safe driving.

To summarize, as described above, with the above-mentioned conventional motor-driven power steering apparatus, the electromagnetic clutch 14 is normally connected during low speed driving as long as no system failure is detected, whereas it is always disconnected during high speed driving irrespective of the presence or absence of a system failure.

Therefore, each time the vehicle speed V decreases below or increases above the predetermined vehicle speed Vo, the electromagnetic clutch 14 is operated to turn on and off. Such frequent on-off operations of the clutch 14 produce great sounds, thus resulting in increased noise and uncomfortable ride. In addition, the durability of the electromagnetic clutch 14 is accordingly reduced. Further, upon the electromagnetic clutch 14 being turned on and off, the driver gripping the steering wheel 1 is frequently subject to undesirable steering shocks.

SUMMARY OF THE INVENTION

Accordingly, the present invention is intended to solve the above-described problems encountered with the conventional motor-driven power steering apparatus.

An object of the invention is to provide an apparatus and a method for motor-driven power steering control in which an electromagnetic clutch, being normally engaged to connect a motor with a steering system during low speed travel of a vehicle, is placed into a partially engaged or slidable state with a reduced clutch current supplied to the clutch during high speed travel of the vehicle, thus improving the durability of the clutch without spoiling the safety in driving as well as suppressing the generation of noise and shocks due to frequent on-off operations of the clutch.

In order to achieve the above object, according to one aspect of the invention, there is provided a motor-driven power steering apparatus for a vehicle comprising: a steering system transmitting a steering force applied to a steering wheel by a driver of the vehicle to steerable road wheels of the vehicle; a vehicle speed sensor for sensing the speed of the vehicle at which the vehicle is travelling; a torque sensor for sensing a steering torque applied to the steering wheel by the driver; a motor coupled via an electromagnetic clutch to the steering system for generating an assisting torque which assists a driver's induced steering motion of the steering system; motor current sensing means for sensing a motor current flowing through the motor; clutch current sensing means for sensing a clutch current flowing through the electromagnetic clutch; motor control means for controlling a motor current supplied to the motor based on the vehicle speed and the steering torque; and clutch control means for controlling a clutch current supplied to the electromagnetic clutch based on the vehicle speed in such a manner that it sets the clutch current to a first predetermined clutch current level so as to place the electromagnetic clutch into a substantially engaged state when the vehicle speed is less than a first predetermined vehicle speed, and to a second predetermined clutch current level which is less than the first predetermined clutch current level so as to place the electromagnetic clutch into a partially engaged state when the vehicle speed is equal to or greater than the first predetermined vehicle speed.

Preferably, the clutch control means sets the clutch current to a third predetermined clutch current level which is less than the second predetermined clutch current level so as to substantially disengage the electromagnetic clutch when the steering torque sensed by the torque sensor is equal to or greater than a predetermined value during the time when the vehicle speed is equal to or greater than the first predetermined vehicle speed.

In one form, the first predetermined clutch current level is variable in accordance with the vehicle speed. In this case, the first predetermined clutch current level is set to a constant value when the vehicle speed is equal to or less than a second predetermined vehicle speed which is less than the first predetermined vehicle speed, and it is gradually changed from the constant value to the second predetermined clutch current level or vice versa in inverse proportion to the vehicle speed when the vehicle speed is between the first and second predetermined vehicle speeds.

In another form, the first predetermined clutch current level is constant irrespective of the vehicle speed.

According to another aspect of the invention, there is provided a method of controlling a motor-driven power steering apparatus for a vehicle in which a motor is coupled via an electromagnetic clutch to a steering system having a steering wheel for generating an assisting torque to assist a steering motion of the steering system induced by a driver of the vehicle, and in which a motor current supplied to the motor is controlled on the basis of a vehicle speed at which the vehicle is travelling, and a steering torque applied to the steering wheel by the driver. The method comprises the steps of; determining whether the vehicle speed is equal to or greater than a first predetermined vehicle speed; setting a clutch current supplied to the electromagnetic clutch to a first predetermined clutch current level so as to place the electromagnetic clutch into a substantially engaged state when the vehicle speed is less than the first predetermined vehicle speed; and setting the clutch current to a second predetermined clutch current level which is less than the first predetermined clutch current level so as to place the electromagnetic clutch into a partially engaged state when the vehicle speed is equal to or greater than the first predetermined vehicle speed.

Preferably, the method further comprises the steps of: determining whether a steering torque applied to the steering wheel by the driver is equal to or greater than a predetermined value when the vehicle speed is equal to or greater than the first predetermined vehicle speed; and setting the clutch current to a third predetermined clutch current level which is less than the second predetermined clutch current level so as to place the electromagnetic clutch into a substantially disengaged state when the steering torque is equal to or greater than the predetermined value during the time when the vehicle speed is equal to or greater than the first predetermined vehicle speed.

The above and other objects, features and disadvantages of the invention will become more readily apparent from the following detailed description of a preferred embodiment of the invention when read with reference to the accompanying drawings.

DETAILED DESCRIPTION OF THE PREFERRED EMBODIMENT

Figure 5:
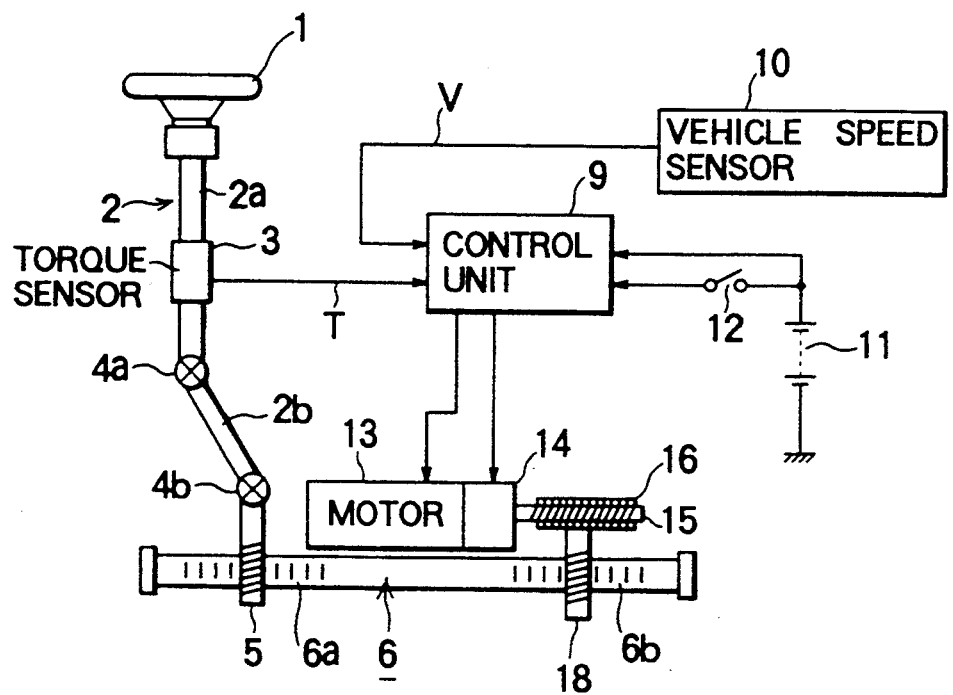
FIG. 5 is a schematic view showing the general arrangement of a conventional motor-driven power steering apparatus to which the present invention is applicable.
Figure 6:
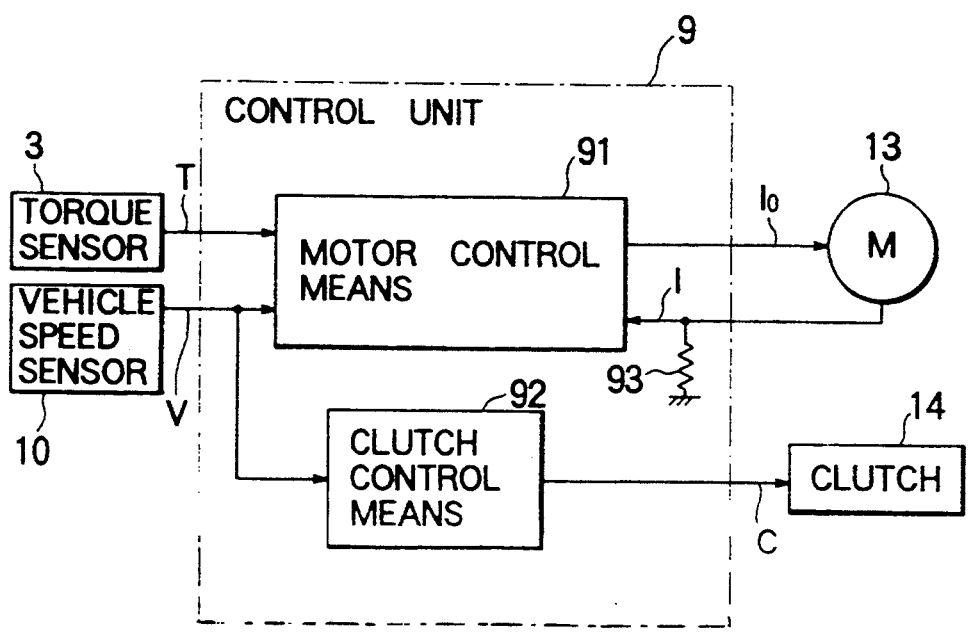
FIG. 6 is a block diagram showing the construction of a conventional control unit shown in FIG. 5.
Figure 7:
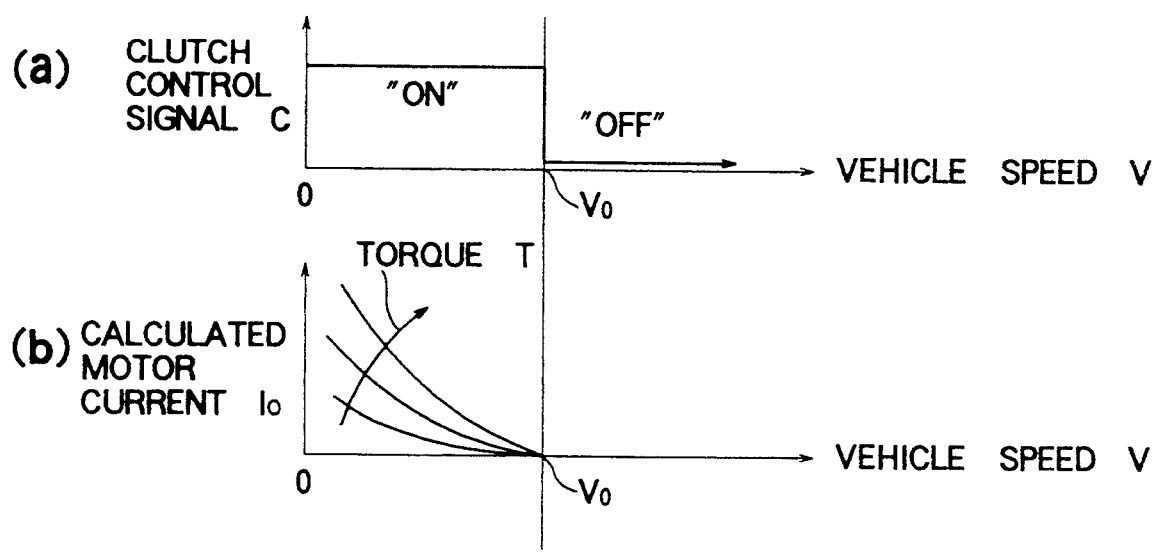
FIG. 7 is a graph illustrating the operation of the conventional control unit of FIG. 6.

A preferred embodiment of the invention will now be described with reference to the drawings. A motor-driven power steering apparatus according to the present invention has a construction substantially similar to that of the conventional apparatus as shown in FIG. 5 except for a control unit 9A. Thus, in the drawings and the following description, the same elements of this embodiment as those in the above-described apparatus of FIG. 5 are identified by the same symbols.

Figure 1:
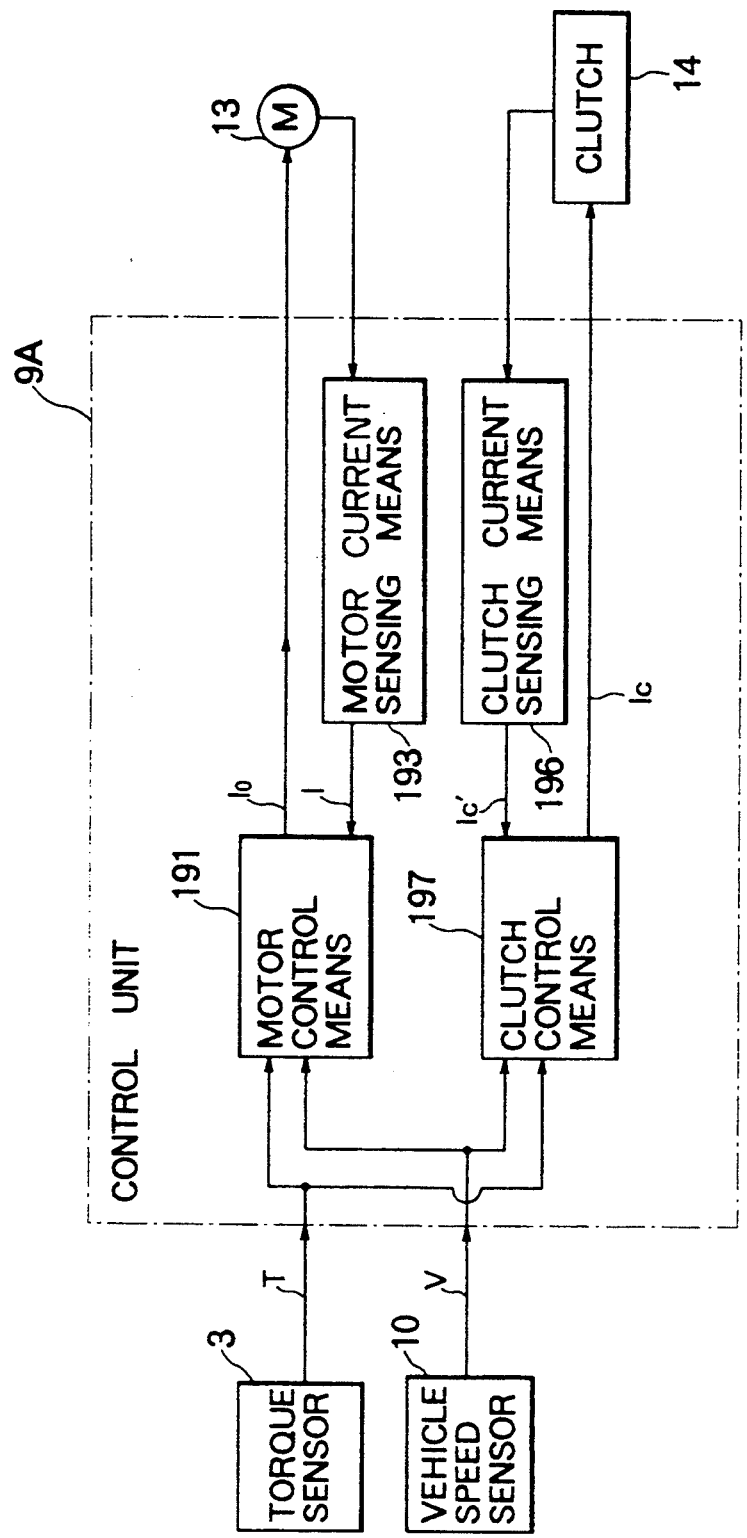
FIG. 1 is a schematic block diagram showing the construction of a control unit of a motor-driven power steering apparatus in accordance with the present invention.

Specifically, as illustrated in FIG. 1, the control unit 9A of the invention includes a motor control means 191 for controlling a motor current Io supplied to the motor 13 (see FIG. 5) based on a steering torque T sensed by the torque sensor 3 and a vehicle speed V sensed by the vehicle speed sensor 10 in a feedback manner, as in the case of the motor control means 91 of the conventional control means 9, and a clutch control means 192 for controlling the electromagnetic clutch 14 based on the steering torque T and the vehicle speed V so as to properly adjust transmission of an assisting torque from the motor 13 to the worm shaft 15 (see FIG. 5) of the steering system.

A motor current sensing means 193 senses a motor current actually flowing through the motor 13 and feeds back a corresponding output signal I to the motor control means 191. A clutch current sensing means 196 senses a clutch current flowing through the electromagnetic clutch 14 and feeds back a corresponding output signal Ic' to the clutch control means 192.

Figure 3:
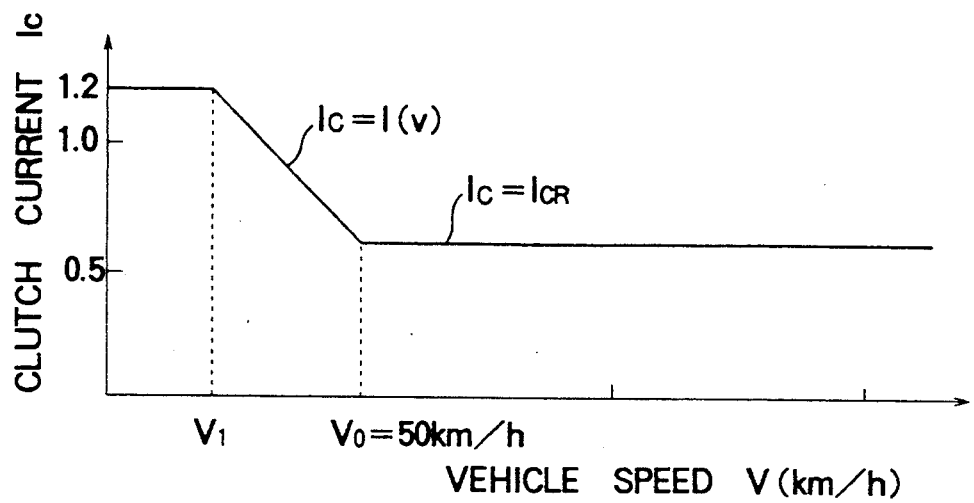
FIG. 3 is a graph showing the relation between the clutch current and the vehicle speed in accordance with the invention.
Figure 4:
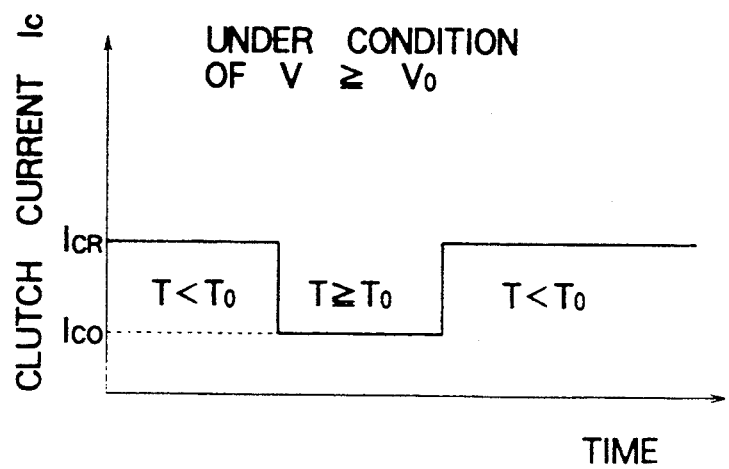
FIG. 4 is a graph showing the relation between the clutch current and the steering torque in accordance with the invention.

As illustrated in a graph of FIG. 3, the clutch control means 197 controls a clutch current Ic supplied to the electromagnetic clutch 14 based on the vehicle speed V in such a manner that it sets the clutch current Ic to a first predetermined clutch current level I(V) when the vehicle speed V is less than a first predetermined vehicle speed Vo (e.g., 50 km/h), and to a second predetermined clutch current level Icr which is less than the first predetermined level I(V) when the vehicle speed V is equal to or greater than the first predetermined vehicle speed Vo. As illustrated in FIG. 4, the clutch control means 197 further sets the clutch current Ic to a third or minimum predetermined clutch current level Ico, which is less than the second predetermined clutch current level Icr, to further reduce the electromagnetic engagement of the clutch 14 into a partially engaged state or a slidable engagement state when the steering torque T sensed by the torque sensor 3 is equal to or greater than a predetermined value To during the time when the vehicle speed V is equal to or greater than the first predetermined vehicle speed Vo. In this regard, the first predetermined clutch current level I(V) may be variable in accordance with the vehicle speed V. Thus, for example, it takes a constant value (e.g., about 1.2 amperes) until the vehicle speed V increases to a second predetermined vehicle speed $V_1$ which is less than the first predetermined vehicle speed Vo, and then it gradually decreases to the second predetermined clutch current level Icr to accordingly reduce the transmission of an assisting torque from the motor 13 to the worm shaft 15 (see FIG. 5) in inverse proportion to the increasing vehicle speed V until the vehicle speed V reaches the first predetermined vehicle speed Vo, and vice versa, as clearly shown in the graph of FIG. 3. After the vehicle speed V exceeds the first predetermined vehicle speed Vo, the clutch current Ic is constantly held at the second predetermined clutch current level Icr. Preferably, the second predetermined level Icr and the third predetermined level Ico are of constant values (e.g., about 0.5 and 0.2 amperes), respectively.

Figure 2:
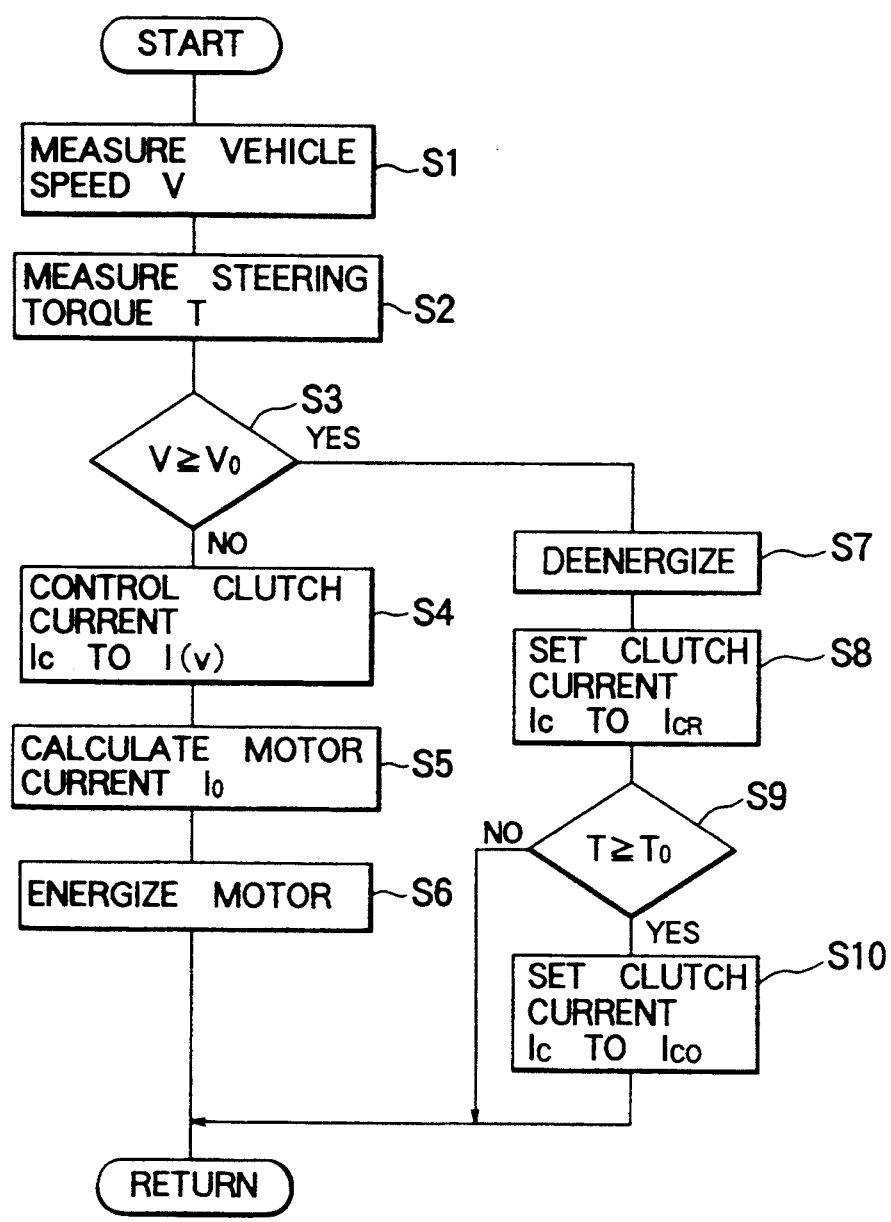
FIG. 2 is a flow chart illustrating a method or operation performed by the control unit of FIG. 1.

Now, the operation of the above embodiment will be described below with reference to the flow chart of FIG. 2.

First, the vehicle speed V and steering torque T are measured in Steps S1 and S2, respectively, and then in Step a check is done as to whether the vehicle speed V is equal to or above the first predetermined value Vo (i.e., it is determined whether the vehicle is in high speed driving).

If the vehicle speed V is lower than the first predetermined value Vo (i.e., V<Vo), then the control process goes to Step S4 where the clutch control means 197 makes the clutch current Ic supplied to the clutch 14 to the first level I(V), which is determined based on the vehicle speed V, as shown in FIG. 3 and described above. In this regard, when the vehicle speed V decreases below the second predetermined vehicle speed $V_1$, the motor current Ic is held at a maximum constant value (e.g., 1.2 amperes) so as to maximize the electromagnetic connection or engagement of the electromagnetic clutch 14 to firmly connect the motor 13 with the worm shaft 15. Subsequently, in Step S5, the motor control means 191 calculates a motor current level Io, and then in Step S6, it supplies a current of the thus calculated level Io from the battery 11 to the motor 13 through the control unit 9A. Thereafter, a return is performed. In this manner, a proper amount of assisting force is transmitted from the motor 13 to the rack rod 6 through the clutch 14, the worm shaft 15, the worm wheel 16 and the second pinion shaft 18 to assist the driver's steering operation.

If, however, it is determined in Step S8 that the vehicle speed V is equal to or greater than the predetermined value Vo, the control process goes to Step S7 where the motor control means 191 changes the motor current level Io to zero to deenergize the motor 13.

Subsequently, in Step S8, the clutch control means 196 sets the clutch current Ic to the second predetermined level Icr which is less than the first predetermined level I(V). At this time, since the clutch current Ic previously set to the first variable level I(V) gradually decreases with the increasing vehicle speed V until the vehicle speed V reaches the first predetermined vehicle speed Vo (e.g., 50 km/h), the electromagnetic engaging force of the clutch 14 accordingly gradually decreases, so there will be no substantial shocks or noise generated upon disengagement of the clutch 14.

Generally, if the clutch current Ic is continuously being held at a level at which the clutch 14 is partially or slidably engaged, the clutch 14 might be brought into a completely disengaged state due to hysteresis in changing of the engaging force of the clutch 14. To avoid this, it is preferred that the second predetermined clutch current level Icr be set to 0.5 amperes or something therearound. This setting permits the clutch 14 to be continuously held at a partially engaged state with a bit stronger engaging force for a longer period of time.

Subsequently, in Step S9, in order to avoid trouble or adverse effects due to a failure or abnormality in the motor 13 particularly during high speed travel of the vehicle (i.e., at a speed equal to or greater than the first predetermined vehicle speed Vo), it is determined whether the steering torque T as sensed by the torque sensor 8 is equal to or greater than a predetermined value To. If not (i.e., T<To), then a return is performed. If T≧To (i.e., a steering torque is applied to the steering wheel by the driver), however, the control process goes to Step S10 where the clutch current Ic is set to the third or minimum predetermined value Ico which is less than the second predetermined value Icr.

For instance, if the driver turns the steering wheel to generate a steering torque T greater than the predetermined value To during the time when the vehicle is travelling at high speeds, the clutch current Ic is set to the predetermined minimum value Ico to further reduce the engaging force of the clutch 14. As a result, the clutch is brought into weaker partial engagement so as to avoid adverse effects due to a motor failure such as a motor lock and the like while ensuring safety in driving.

Moreover, in the event that an abnormal torque is generated by the motor 13 during high speed travel, it is sensed by the torque sensor 3 and the clutch current Ic is reduced to the minimum value Ico. Accordingly, the steering system inclusive of the elements 1, 2, 5 and 6 is free from any adverse influences from such an abnormal steering torque even if the electromagnetic clutch 14 is not completely disengaged.

In this connection, during high speed travel, the clutch current Ic can always be controlled to the minimum value Ico irrespective of the presence or absence of a steering torque. In this case, however, the clutch 14 can be brought into completely disengaged state, as noted above, so that when the vehicle speed V decreases below the first predetermined value Vo, the clutch 14 is switched on into an engaged state, thus resulting in undesirable on-off operations of the clutch 14.

If, however, the clutch current Ic is made to the minimum value Ico only when a steering torque T is sensed by the torque sensor 8 during high speed travel, the clutch 14 continuously remains on when the vehicle is changed from the high speed travel into low speed travel, thus avoiding on-off operations of the clutch.

In this manner, simply by reducing the clutch current Ic to permit slidable engagement of the clutch 14 and to decrease the transmission of a steering torque from the motor 13 to the steering system via the clutch 14 during the time when the vehicle speed V is increasing, frequent on-off operations of the clutch 14 due to repeated changing of the vehicle speed above and below the predetermined value Vo can be avoided, thus preventing resultant inconveniences such as frequent generation of noise and shocks as well as unintended steering motion or incapability of steering which would otherwise result from a failure or malfunction of the motor control means 191 inclusive of the sensors 3, 10 and the motor 13.

Although in the above embodiment, the first predetermined clutch current value I(V) for the vehicle speed V less than the predetermined value Vo is variable in accordance with the vehicle speed V, it can instead be set to a constant value, e.g., 1 ampere or thereabout.

What is claimed is:

1. A motor-driven power steering apparatus for a vehicle comprising:
    a steering system transmitting a steering force applied to a steering wheel by a driver of the vehicle to steerable road wheels of the vehicle;
    a vehicle speed sensor for sensing the speed of the vehicle at which the vehicle is travelling;
    a torque sensor for sensing a steering torque applied to said steering wheel by the driver;
    an electromagnetic clutch;
    a motor coupled via said electromagnetic clutch to said steering system for generating an assisting torque which assists a driver's induced steering motion of said steering system;
    motor current sensing means for sensing a motor current flowing through said motor;
    clutch current sensing means for sensing a clutch current flowing through said electromagnetic clutch;
    motor control means for controlling a motor current supplied to said motor based on the vehicle speed and the steering torque; and
    clutch control means for controlling a clutch current supplied to said electromagnetic clutch based on the vehicle speed in such a manner that it sets the clutch current to a first predetermined clutch current level so as to place said electromagnetic clutch into a substantially engaged state when the vehicle speed is less than a first predetermined vehicle speed, and to a second predetermined clutch current level which is less than said first predetermined clutch current level so as to place said electromagnetic clutch into a partially engaged state when the vehicle speed is equal to or greater than the first predetermined vehicle speed.

2. A motor-driven power steering apparatus according to claim 1, wherein said clutch control means sets the clutch current to a third predetermined clutch current level which is less than the second predetermined clutch current level so as to substantially disengage said electromagnetic clutch when the steering torque sensed by said torque sensor is equal to or greater than a predetermined value during the time when the vehicle speed is equal to or greater than the first predetermined vehicle speed.

3. A motor-driven power steering apparatus according to claim 1, wherein the first predetermined clutch current level is variable in accordance with the vehicle speed.

4. A motor-driven power steering apparatus according to claim 3, wherein the first predetermined clutch current level is set to a constant value when the vehicle speed is equal to or less than a second predetermined vehicle speed which is less than the first predetermined vehicle speed, and it is gradually changed from one of the constant value and the second predetermined clutch current level to another of the constant value and the second predetermined clutch current level in an inverse proportion to the vehicle speed when the vehicle speed is between the first and second predetermined vehicle speeds.

5. A motor-driven power steering apparatus according to claim 1, wherein the first predetermined clutch current level is constant irrespective of the vehicle speed.

6. A method of controlling a motor-driven power steering apparatus for a vehicle in which a motor is coupled via an electromagnetic clutch to a steering system having a steering wheel for generating an assisting torque to assist a steering motion of said steering system induced by a driver of the vehicle, and in which a motor current supplied to said motor is controlled on the basis of a vehicle speed at which the vehicle is -travelling, and a steering torque applied to said steering wheel by the driver, said method comprising the steps of;
    determining whether the vehicle speed is equal to or greater than a first predetermined vehicle speed;
    setting a clutch current supplied to said electromagnetic clutch to a first predetermined clutch current level so as to place said electromagnetic clutch into a substantially engaged state when the vehicle speed is less than the first predetermined vehicle speed; and
    setting the clutch current to a second predetermined clutch current level which is less than the first predetermined clutch current level so as to place said electromagnetic clutch into a partially engaged state when the vehicle speed is equal to or greater than the first predetermined vehicle speed.

7. A motor-driven power steering method according to claim 6, further comprising the steps of:
    determining whether a steering torque applied to said steering wheel by the driver is equal to or greater than a predetermined value when the vehicle speed is equal to or greater than the first predetermined vehicle speed; and
    setting the clutch current to a third predetermined clutch current level which is less than the second predetermined clutch current level so as to place said electromagnetic clutch into a substantially disengaged state when the steering torque is equal to or greater than the predetermined value during the time when the vehicle speed is equal to or greater than the first predetermined vehicle speed.

8. A motor-driven power steering method according to claim 6, further comprising the step of determining the first predetermined clutch current level in accordance with the vehicle speed.

9. A motor-driven power steering method according to claim 8, further comprising the steps of:
    setting the first predetermined clutch current level to a constant value when the vehicle speed is equal to or less than a second predetermined vehicle speed which is less than the first predetermined vehicle speed: and
    gradually changing the first predetermined clutch current level from the constant value to the second predetermined current level or vice versa in inverse proportion to the vehicle speed when the vehicle speed is between the first and second predetermined vehicle speeds.

10. A motor-driven power steering method according to claim 6, further comprising the step of setting the first predetermined value to a constant value irrespective of the vehicle speed.

* * * * *